C. L. MASKEY.
AUTOMOBILE LOCKING MECHANISM.
APPLICATION FILED JAN. 17, 1910.
1,022,431.
Patented Apr. 9, 1912.
2 SHEETS—SHEET 1.
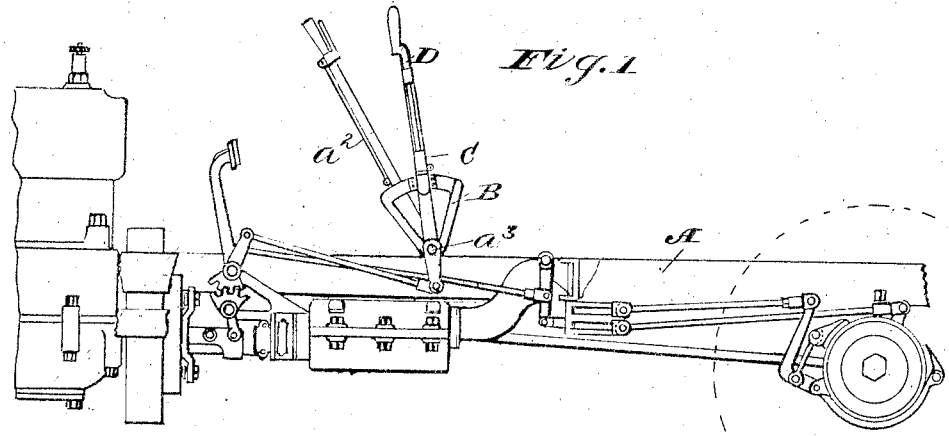
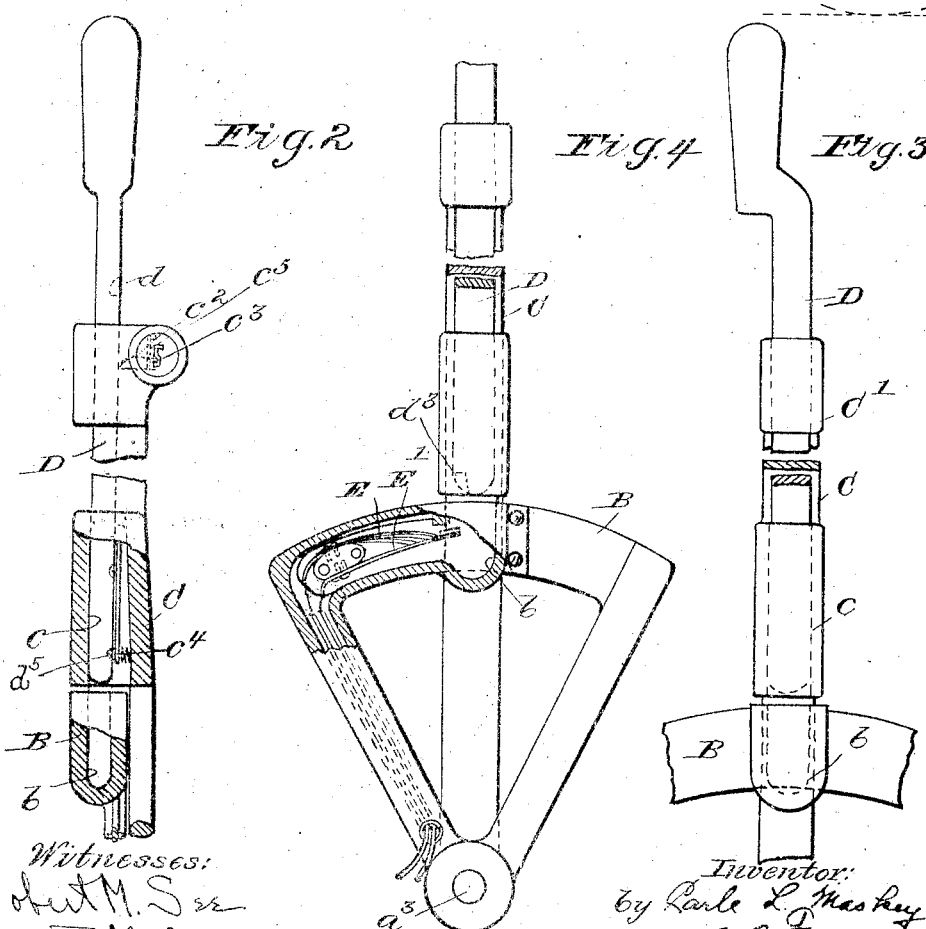

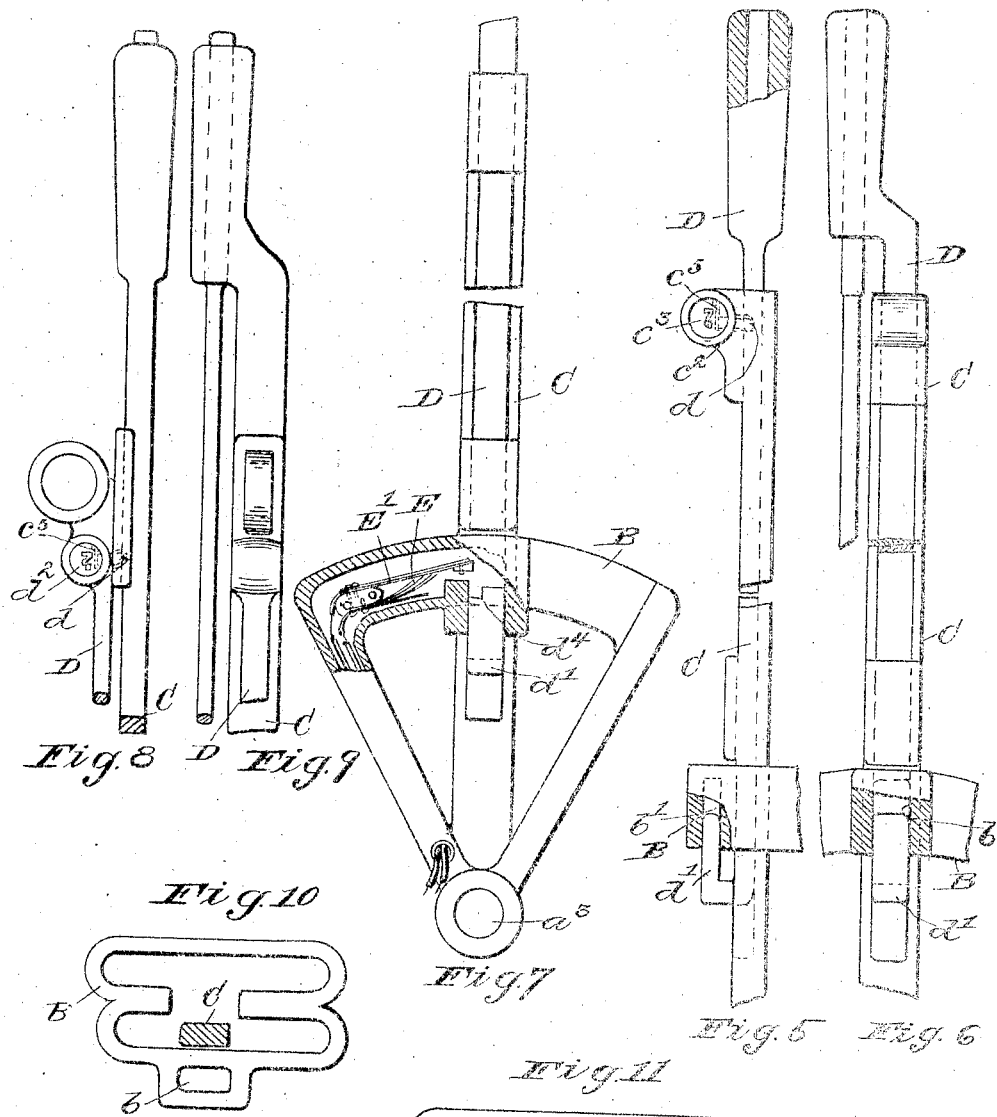

# UNITED STATES PATENT OFFICE.

CARLE L. MASKEY, OF CLEVELAND, OHIO.

AUTOMOBILE LOCKING MECHANISM.

1,022,431.   Specification of Letters Patent.   Patented Apr. 9, 1912.

Application filed January 17, 1910. Serial No. 538,441.

*To all whom it may concern:*

Be it known that I, CARLE L. MASKEY, a citizen of the United States, and a resident of Cleveland, county of Cuyahoga, and State of Ohio, have invented a new and useful Improvement in Automobile Locking Mechanism, of which the following is a specification, the principle of the invention being herein explained and the best mode in which I have contemplated applying that principle, so as to distinguish it from other inventions.

My invention relates to locking devices for automobiles.

The theft of automobiles which have been allowed to stand unattended in public thoroughfares and elsewhere has become so common that it presents a grave problem to automobile owners, and even if the automobile is not stolen it is frequently damaged by intermeddling with the operating mechanism by some unauthorized person.

The present invention effectually solves this problem by positively locking the machine against movement and at the same time breaking the electric circuit which controls the ignition of fuel in the cylinders.

Furthermore, the invention provides a safeguard against the liability of the operator himself starting the engine when the transmission gearing is connected, or the brakes are not set.

The several advantages of my improved device will appear from a detailed description.

To the accomplishment of these and related ends said invention, then, consists of the means hereinafter fully described and particularly pointed out in the following claims.

The annexed drawings and the following description set forth in detail certain mechanism embodying the invention, such disclosed means constituting, however, but one of various mechanical forms in which the principle of the invention may be used.

In said annexed drawings:—Figure 1 is a partial side elevation more or less diagrammatic of an automobile chassis equipped with my improved locking device; Fig. 2 is a broken elevation, partly in section, of my device; Fig. 3 is a broken elevation taken at right angles to Fig. 2; Fig. 4 is a view similar to that in Fig. 3 showing, in addition the circuit breaking attachment; Figs. 5, 6 and 7 illustrate modifications of the form in Figs. 2, 3 and 4 respectively; Figs. 8 and 9 represent a still further modification of the form shown in Figs. 2 and 3 respectively; Fig. 10 is a plan of the grid in which the gear shifting lever works, the latter being shown in section; Fig. 11 is a similar plan, which also shows the circuit breaking device.

In Fig. 1, A represents the chassis of any usual type of automobile which is equipped with the usual speed segment B, such as is usually used in automobiles equipped with the selective type of transmission. A shaft $a^3$ at the center of the circle on which the speed segment is formed forms the pivotal axis for a lever C which is connected to shift the gears for the purpose of selecting different speeds, while the lever $a^2$ is connected to operate the so called emergency brakes, and at the same time to throw out the clutch. The device embodying the present invention may be installed equally as well upon the emergency brake lever as upon the gear shifting lever, and it is to be understood that throughout the description and claims wherever one lever is referred to it is meant to include either or both of these levers despite the specific term used.

Referring to Figs. 2, 3 and 4, the device, which in itself represents the present invention, is illustrated in one form, the speed segment being represented by B. The gear shifting lever C rocks upon the shaft $a^3$, a longitudinal slot $c$ extending through the upper part of the lever, and in the slot $c$ is slidably held a rod D, the slot and the rod carried therein being located in the gear shifting lever above the speed segment. A socket $b$ is formed in the speed segment B, and the socket $b$ is designed to register with the slot $c$ when the gear shifting lever is in its neutral position, or if the device is attached to the emergency brake lever, when the latter is in set position. Normally the rod D will be in its upper position and is so held by a spring-pressed projection $c^4$ carried by the lever C which engages a recess $d^5$ in the rod D, the rod D thus in effect forming the handle part of a two-part gear shifting lever. While the rod is in this position, it is obvious that the gear shifting lever C is free to rock upon shaft $a^3$ so that the gears may be shifted as desired. When, however, the operator desires to leave his machine, and preparatory thereto has set the gear shifting lever in neutral position, a blow with the hand upon the top of rod D will drive the lower end thereof into the socket b in the speed segment B, so that further movement of the lever C is rendered impossible. When the rod D is so depressed, a suitable bolt $c^2$ carried by the lever C and pressed forwardly by a spring $c^5$ engages a recess d in the rod D and is thereupon automatically locked in such engagement, the bolt being returnable to its disengaging position only by operation of lock $c^3$ with a key. It will thus be seen that when the rod D is depressed, the gear shifting lever, or the emergency brake lever, is locked in neutral or in set position, respectively, and further operation of the machine is impossible until the rod has been raised. In Fig. 4 the device just described is illustrated in connection with a circuit breaking device. The contacts E and E' are located within the speed segment and are in the electric circuit which controls ignition of the fuel of the engine. The contact E' extends outwardly into the slot b, and the lower end of rod D is formed with a notch $d^3$. When the rod D is depressed, as has been described, it engages and depresses with it the contact E' which obviously breaks the circuit and provides a still further safeguard against theft or accident.

Figs. 5 and 6 illustrate a modification of the device which has been described above, the modification being that the speed segment B is formed with a socket b' on its under side instead of a socket b on its upper side, while the rod D is formed at its lower end with an upturned hook d'. It is obvious, then, that by raising the rod D in this form, the same result is obtained which was reached in the first form by depressing the rod. Fig. 7 illustrates this form in connection with a circuit breaker, in which the positions of the contacts E and E' are reversed from the relative positions shown in Fig. 4, so that when the rod D is pulled upwardly it raises the contact E' and breaks the circuit.

Figs. 8 and 9 represent a still further modification of the device as first described, the modification here consisting in constructing the gear shifting lever C as a one-piece lever terminating at its upper end in a handle and having slidably attached thereto the rod D, which is formed with a ring at its upper end. The rod D in this form functions just as it does in the first form, the difference in the two forms being that in the first form the gear shifting lever is really a two-part lever, one part of which may be depressed to engage the locking socket, while in the form under consideration, the lever is formed in one piece and has attached to it a separate locking rod.

The operation and advantages of the device in its various forms are obviously pointed out in the detailed description which has been given.

Supposing my improved locking mechanism to be attached to the gear shifting lever, and supposing the driver to have pulled the lever into neutral position so that the transmission gearing is not connected with the engine, depression of the rod carried by the lever in one form, or elevation of such rod in the other form, securely locks the lever against movement from such neutral position. If, in addition, the circuit breaking device be constructed in the speed segment, such depression or elevation of the rod when it locks the lever against further movement, simultaneously breaks the ignition circuit so that the engine is inoperative equally with the transmission gearing. When the rod is so depressed or raised, in the alternative forms, it is held in such locking position by the spring lock so that the driver may leave the car with absolute assurance that no intermeddler may steal it or damage it by tampering with the operating mechanism. When the driver himself wishes again to start the car, it is absolutely impossible for him to inadvertently start the engine while the transmission gearing is connected because the ignition circuit is broken, and before he can do so he must unlock the depressed or raised rod, as the case may be, and then raise or depress it. This operation makes the ignition circuit complete and he may start the engine, but in performing this operation his mind is centered upon the position of the gear shifting lever, and it will obviously, therefore, remain in neutral position until he is quite prepared to start his car.

It is finally again to be noted that the device may be attached equally well to the emergency brake lever so that the driver when leaving his car may lock such lever in set position, and at the same time break the ignition circuit. Before he starts his car he must raise the locking rod to complete the ignition circuit, but in doing so he is assured that his emergency brakes are set and he is minded to so leave them until he is entirely ready to actually start the car. Therefore in the following claims the term "operating lever" includes both "brake lever" and the term "gear shifting lever."

Furthermore, it will be understood that if the device is installed on the brake lever the latter will be locked in set position, while if it is installed upon the gear shifting lever the latter will be locked in neutral position. In order to comprehend these two alternatives in the claims I have employed therein the term "inoperative position" so that in the claims the reference to an "operating lever" being in "inoperative position" includes either the brake lever being in set position, or the gear shifting lever being in neutral position.

I claim—

1. In mechanism of the class described the combination with an operating lever, a rod slidably attached to said lever, a guide segment therefor, said segment having a slot and said rod being adapted to enter such slot when said lever is in inoperative position; of an electric circuit and two contacts adapted to close said circuit and carried on said segment, said circuit being normally closed, and one of said contacts extending into such slot whereby said circuit is broken upon the entrance of said rod into such slot.

2. In mechanism of the class described, the combination with an operating lever, a rod slidably attached to said lever, a guide segment for said lever, said segment having a slot and said rod being adapted to enter such slot when said lever is in inoperative position; of an electric circuit; and two contacts, adapted to close said circuit, and carried on said segment, said circuit being normally closed, and one of said contacts extending into such slot in the path of said rod, and being movable away from the fixed contact upon the entrance of said rod into said slot, whereby the circuit is broken.

3. In mechanism of the class described the combination with an operating lever, a rod slidably attached to said lever, a guide segment for said lever, said segment having a slot and said rod being adapted to enter such slot when said lever is in inoperative position; of an electric circuit; and two contacts, adapted to close said circuit, and carried on said segment, said circuit being normally closed, and one of said contacts extending into such slot in the path of said rod, and being movable in said slot away from the fixed contact, upon being actuated by the engagement of said rod with said slot.

Signed by me this 27th day of December, 1907.

CARLE L. MASKEY.

Attested by—
D. T. DAVIES,
JNO. F. OBERLIN.